United States Patent
Baker et al.

(10) Patent No.: US 8,696,004 B2
(45) Date of Patent: Apr. 15, 2014

(54) SPRING SEAT HAVING AN INSTALLATION LAND/STEP

(75) Inventors: Lynn R. Baker, Monroe, MI (US); Rand Raymo, Lambertville, MI (US); Jason Shaw, Monroe, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 167 days.

(21) Appl. No.: 13/314,314

(22) Filed: Dec. 8, 2011

(65) Prior Publication Data
US 2013/0147149 A1    Jun. 13, 2013

(51) Int. Cl.
*B60G 15/00* (2006.01)

(52) U.S. Cl.
USPC .............................. 280/124.147; 280/124.155

(58) Field of Classification Search
USPC ................ 280/124.146, 124.147, 124.155, 280/124.179, 124.151, 124.141, 124.142, 280/685, FOR. 117, FOR. 118, FOR. 119, 280/FOR. 121, FOR. 153, FOR. 158, 280/FOR. 179, FOR. 181; 267/178, 248, 267/253, 254, 286, 190, 202, 209
See application file for complete search history.

(56) References Cited

U.S. PATENT DOCUMENTS

| | | | | |
|---|---|---|---|---|
| 6,082,720 A | * | 7/2000 | Ducloux et al. | 267/221 |
| 6,149,171 A | * | 11/2000 | Bono et al. | 280/124.179 |
| 6,155,543 A | * | 12/2000 | Solomond et al. | 267/216 |
| 6,692,012 B2 | * | 2/2004 | Fullenkamp et al. | 280/124.154 |
| 6,883,651 B2 | * | 4/2005 | Fukaya | 188/322.12 |
| 7,959,171 B2 | | 6/2011 | Takahashi et al. | |
| 8,196,941 B2 | * | 6/2012 | Nowak | 280/124.154 |
| 2002/0135213 A1 | | 9/2002 | Fullenkamp et al. | |
| 2005/0012292 A1 | * | 1/2005 | Kuki et al. | 280/124.155 |
| 2011/0221158 A1 | * | 9/2011 | Stautner et al. | 280/124.147 |

FOREIGN PATENT DOCUMENTS

| | | |
|---|---|---|
| JP | 2011-063200 | 3/2011 |
| KR | 10-2005-0079668 | 6/2005 |
| WO | 2011-139534 | 11/2011 |

OTHER PUBLICATIONS

Search Report and Written Opinion dated Mar. 15, 2013 from corresponding PCT Application No. PCT/US2012/063680 (8 pages).

* cited by examiner

*Primary Examiner* — Drew Brown
(74) *Attorney, Agent, or Firm* — Harness, Dickey & Pierce, P.L.C.

(57) ABSTRACT

A strut assembly includes a top mount assembly, a shock absorber, a lower spring seat and a spring extending between the top mount assembly and the lower spring seat. The lower spring seat includes an annular disc and a tubular extension extending from the annular disc. The tubular wall defines a plurality of lands or steps which define bearing surfaces which are used to press the lower spring seat onto the shock absorber.

21 Claims, 4 Drawing Sheets

SPRING SEAT HAVING AN INSTALLATION LAND/STEP

FIELD

The present disclosure relates to a McPherson strut assembly for a motor vehicle. More particularly, the present disclosure relates to the spring seat of the McPherson strut assembly.

BACKGROUND

This section provides background information related to the present disclosure which is not necessarily prior art.

Strut-type suspension systems are well known in the motor vehicle industry. A telescopic strut assembly normally incorporating a hydraulic damper is used as one of the locating members for the wheel of the motor vehicle. The most common form of a strut-type suspension is the McPherson strut suspension system. The McPherson strut assembly includes a coil spring located concentrically around the telescopic strut which is the shock absorber. The upper end of the McPherson strut assembly includes an upper mounting assembly which is mounted in a tower formed by the vehicle body at a position above the wheel arch of the vehicle.

The coil spring is located around the shock absorber and it extends between an upper spring seat which is a part of the top mount assembly for the strut assembly and a lower spring seat which is attached, typically by welding, to the shock absorber of the strut assembly. The spring seats of the strut assembly have several functions for the suspension system. The spring seats support and maintain the correct position of the spring and support the loading on the spring under all driving conditions of the vehicle for the entire life of the vehicle. The spring seats are mechanically resistant during the life of the vehicle. They resist braking loads, deformations, wear, abrasion, changing loads and hits by stones and other debris. The spring seat is environmental and corrosion resistant to different temperatures, different moisture levels, aggressive liquids and gasses. The spring seats ensure proper fixing of the components of the strut assembly, easy assembly of the strut assembly into the vehicle and with the other components of the strut assembly they resist any unwanted displacements and/or rotations. The design of the spring seats also ensure that the spring to spring seat contact does not promote or accelerate corrosion of the spring or the spring seat.

The prior art low spring seats are typically a single piece stamped or formed component. The single piece lower spring seat includes an annular disc that supports the lower end of the spring and a tubular extension which extends from the annular disc. The tubular extension is designed to be welded or otherwise attached to the outer tube of a hydraulic damper or shock absorber that is a component of the telescopic strut assembly.

The tubular extension defines a center axis which is located at an angle with respect to the planar surface defined by the annular disc that supports the lower end of the spring. The center axis of the tubular extension is co-linear with a center axis defined by the outer tube of the hydraulic damper or shock absorber. The angle between the center axis of the tubular extension and the planar surface defined by the annular disc is determined by the design specifications for the suspension assembly and thus each lower spring seat can have a different angular relationship.

This difference in angular relationship can create issues when designing the assembly equipment for the telescopic strut assembly. Typically, the tubular extension of the lower spring seat is press fit over the outer tube of the hydraulic damper or shock absorber. Because the wall thickness of the tubular extension is too thin to act as a bearing surface for the tooling during the press fit operation, the tooling that presses the lower spring seat onto the outer tube of the hydraulic damper or shock absorber must be designed to bear against the annular disc of the lower spring seat. Thus, for each design of lower spring seat, a new set of press fit tooling needs to be designed and manufactured.

SUMMARY

This section provides a general summary of the disclosure, and is not a comprehensive disclosure of its full scope or all of its features.

The present disclosure provides the art with a lower spring seat design that allows the same press fit tooling to be used regardless of the angular relationship between the tubular extension and the annular disc of the lower spring seat.

The tubular extension of the lower spring seat includes a plurality of lands or steps that define a bearing surface for the press fit tooling. The plurality of lands or steps define the bearing surface which defines a plane that is perpendicular to the center axis of the tubular extension. This ensures that the loading on the tubular extension will be parallel to the center axis of the center tube.

Because the bearing surface for the press fit tooling is located on the tubular extension and not on the annular disc of the lower spring seat, the same press fit tooling can be used for all of the spring seats having the plurality of lands or steps regardless of the angular relationship between the tubular extension and the annular disc of the lower spring seat.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
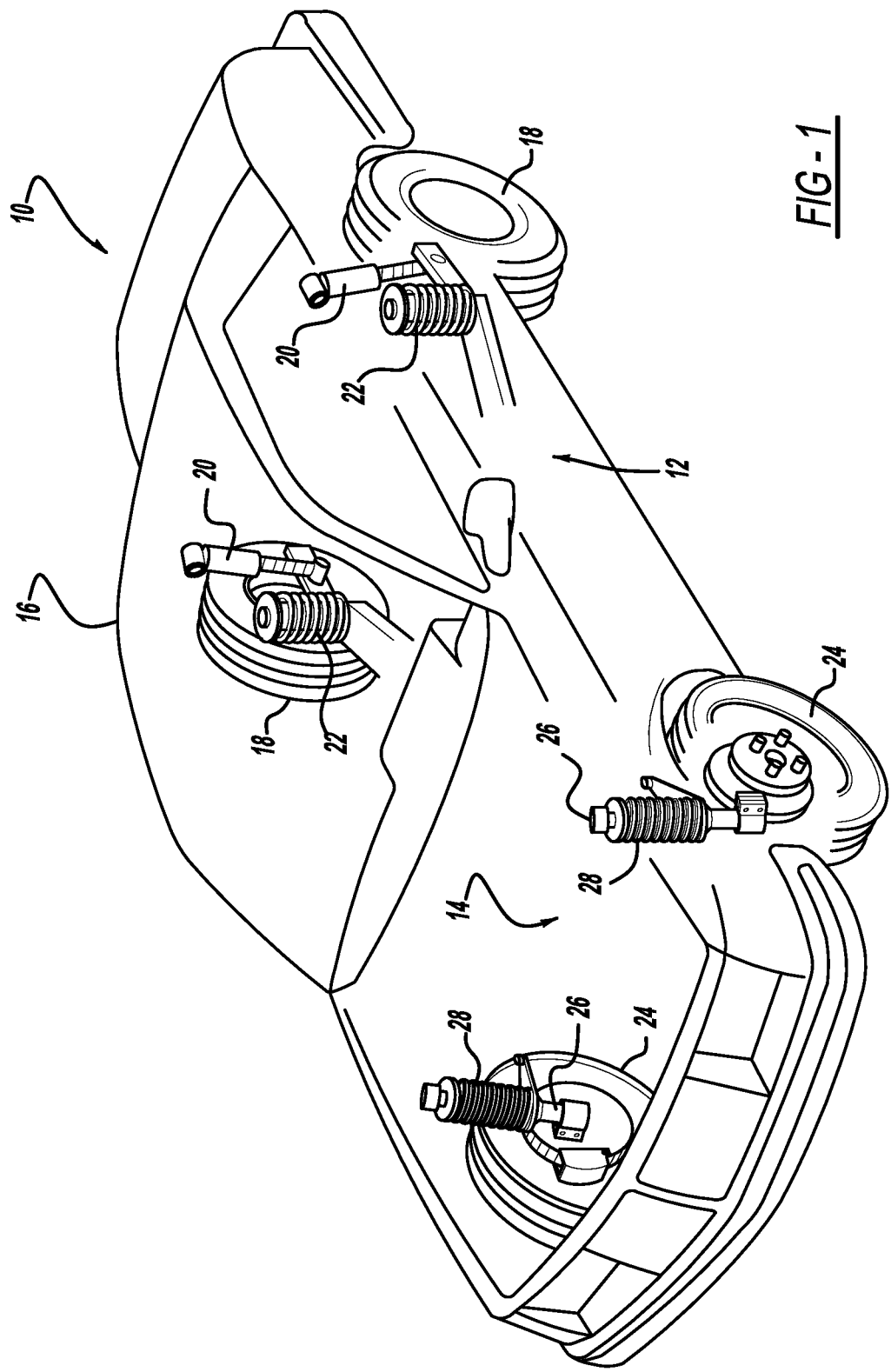
FIG. 1 is an illustration of an automobile using strut assemblies in accordance with the present invention.

There is shown in FIG. 1 a vehicle incorporating a suspension system having the strut assembly in accordance with the present invention and which is designated generally by the reference numeral 10. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly front suspension 14 includes a transversely extending front axle assembly (not shown) to operatively support the vehicle's front wheels 24. The front axle assembly is operatively connected to body 16 by means of a second pair of shock absorbers 26 and by a pair of shaped helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles and/or in other types of applications such as vehicles incorporating independent front and/or independent rear suspension systems. Further, the term "shock absorber" as used herein is meant to be dampers in general and thus will include struts. Also, while front suspension 14 is illustrated having a pair of struts or shock absorbers 26, it is within the scope of the present invention to have rear suspension 12 incorporate a pair of struts or shock absorbers 26 if desired.

Figure 2:
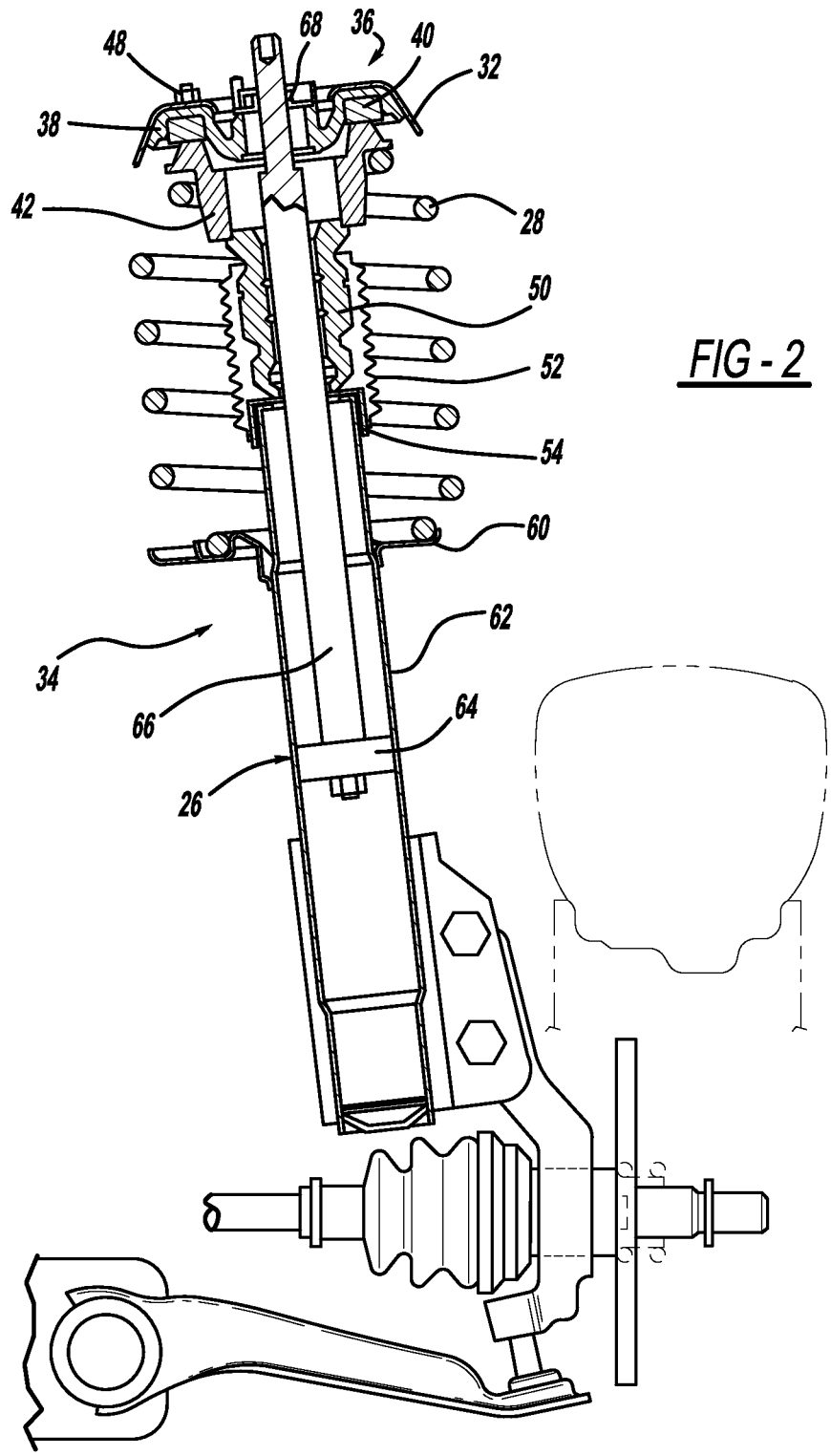
FIG. 2 is a side view of one of the front suspension units that incorporate the strut assembly in accordance with the present invention.

Referring now to FIG. 2, the front wheel assembly for vehicle 10 is illustrated in greater detail. Body 16 defines a shock tower 32 comprising sheet metal of vehicle 10 within which is mounted a strut assembly 34 which comprises a telescoping device in the form of shock absorber 26, coil spring 28 and a top mount assembly 36. Strut assembly 34 including shock absorber 26, coil spring 28 and top mount assembly 36 are attached to vehicle 10 using shock tower 32. Top mount assembly 36 comprises a top mount 38, a bearing assembly 40 and an upper spring seat 42. Top mount 38 comprises an integral molded body and a rigid body member, typically made of stamped steel. Top mount assembly 36 is mounted to shock tower 32 by bolts 48. Bearing assembly 40 is friction fit within the molded body of top mount 38 to be seated in top mount 38 so that one side of bearing assembly 40 is fixed relative to top mount 38 and shock tower 32. The second side of bearing assembly freely rotates with respect to the first side of bearing assembly 40, top mount 38 and shock tower 32.

The free rotating side of bearing assembly 40 carries upper spring seat 42 that is clearance fit to the outer diameter of bearing assembly 40. A jounce bumper 50 is disposed between upper spring seat 42 and shock absorber 26. Jounce bumper 50 comprises an elastomeric material which is protected by a plastic dirt shield 52. A bumper cap 54 is located on shock absorber 26 to interface with jounce bumper 50 and plastic dirt shield 52.

A lower spring seat 60 is attached to shock absorber 26 and coil spring 28 is disposed between upper spring seat 42 and lower spring seat 60 to isolate body 16 from front suspension 14. Shock absorber 26 comprises an outer tube 62, a piston assembly 64 and a telescoping rod or piston rod 66. While shock absorber 26 is illustrated as a mono-tube design, it is within the scope of the present invention to utilize a dual-tube shock absorber for shock absorber 26. In this design, lower spring seat 60 would attach to the reserve tube of the dual tube shock absorber. Also, while shock absorber 26 is illustrated in FIG. 2, it is to be understood that shock absorber 20 may also include the features described herein for shock absorber 26.

Prior to the assembly of strut assembly 34 into vehicle 10, the pre-assembly of strut assembly 34 is performed. Bumper cap 54, jounce bumper 50 and plastic dirt shield 52 are assembled to shock absorber 26. Coil spring 28 is assembled over shock absorber 26 and positioned within lower spring seat 60. Upper spring seat 42 is assembled onto shock absorber 26 and correctly positioned with respect to coil spring 28. Bearing assembly 40 is positioned on top of upper spring seat 42 and top mount 38 is positioned on top of bearing assembly 40. This entire assembly is positioned within an assembly machine which compresses coil spring 28 such that the end of piston rod 66 extends through a bore located within top mount assembly 36. A retaining nut 68 is threadingly received on the end of piston rod 66 to secure the assembly of strut assembly 34.

Top mount 38 is designed as an identical component for the right and left hand sides of the vehicle but it has a different orientation with respect to shock absorber 26 and its associated bracketry when it is placed on the right or left side of the vehicle.

Figure 3:
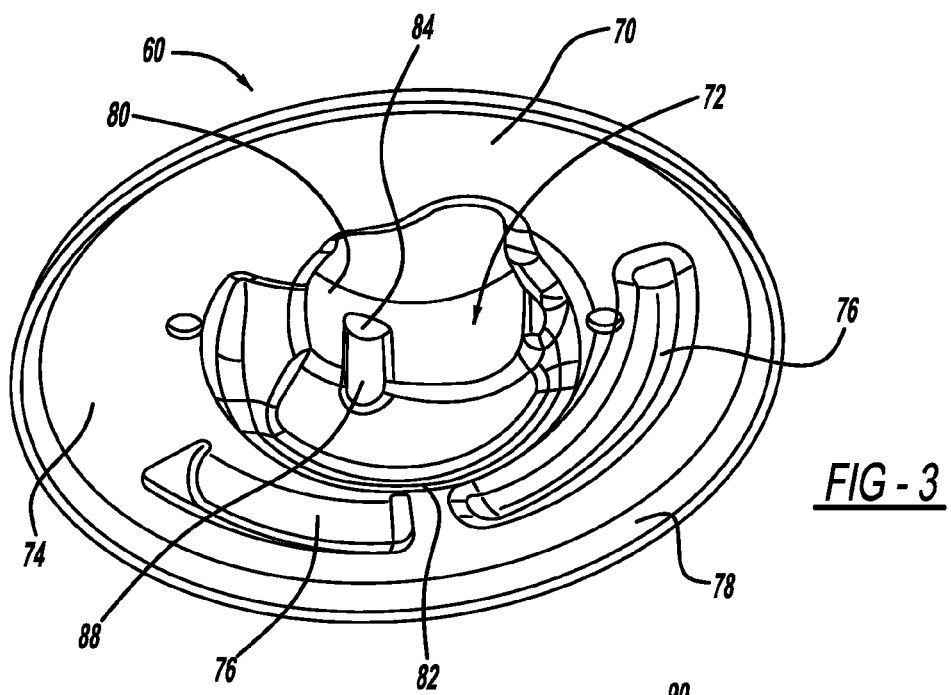
FIG. 3 is a perspective view of the lower spring seat illustrated in FIG. 2.
Figure 4:
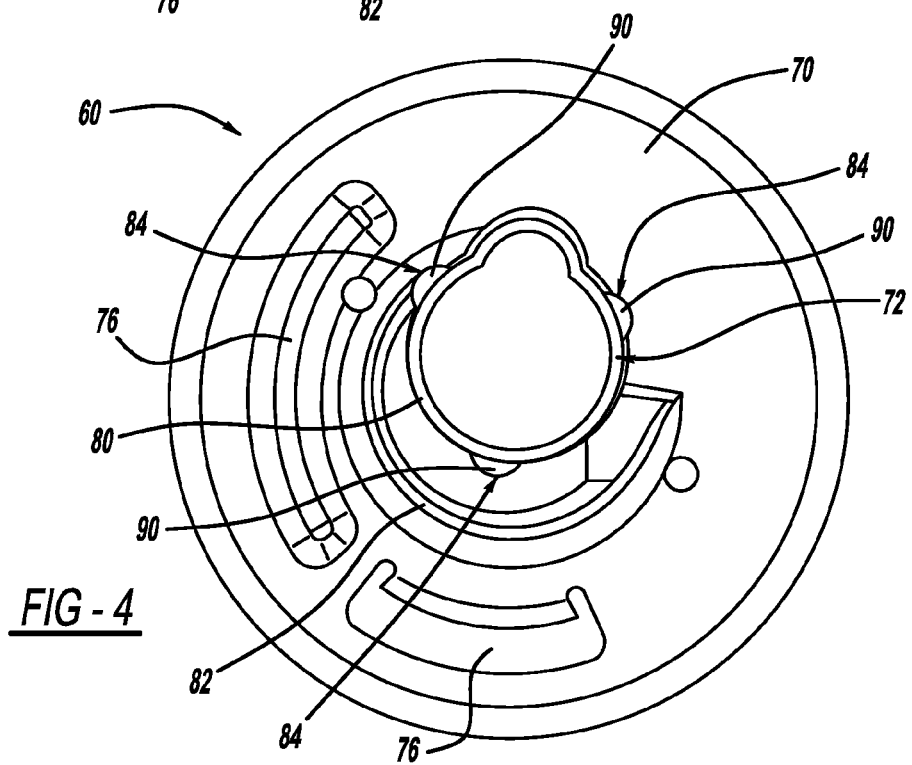
FIG. 4 is a plan view of the lower spring seat illustrated in FIGS. 2 and 3; and, FIG. 5 is a cross-sectional view of the lower spring seat illustrated in FIGS. 2-4.
Figure 5:
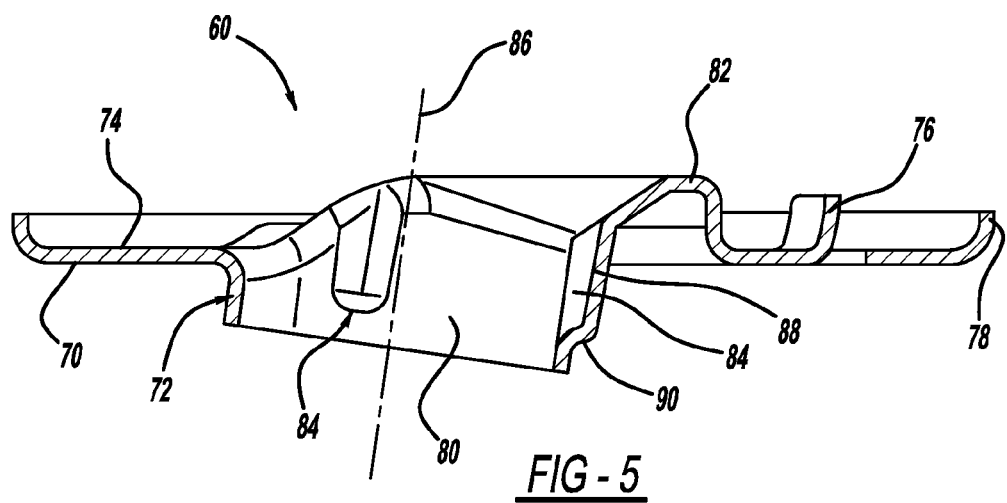

Referring now to FIGS. 3-5, lower spring seat 60 is illustrated in greater detail. Lower spring seat 60 comprises an annular disc 70 and a tubular extension 72.

Annular disc 70 defines a planar surface 74, one or more arced guides 76 and an outer flange 78. Coil spring 28 sits on planar surface 74. The one or more arced guides 76 are designed to position the lower coil of coil spring 28 in a position where it nests between arced guides 76 and outer flange 78. Outer flange 78 totally encircles coil spring 28 and aids in keeping coil spring 28 centered with respect to annular disc 70 of lower spring seat 60.

Tubular extension 72 extends outward from annular disc 70 in a direction opposite to arced guides 76 and outer flange 78. Tubular extension 72 is positioned at a specified angle (less than 90° as illustrated in the drawings) with respect to planar surface 74 of annular disc 70. Tubular extension 72 includes a tubular wall 80 that is integral with annular disc 70 such that lower spring seat 60 is a single piece component. A transition section 82 connects tubular wall 80 with annular disc 70. Tubular wall 80 of tubular extension defines a plurality of lands or steps 84 (three in the embodiment illustrated) which extend radially outward from the axial centerline 86 of tubular wall 80.

Each land or step 84 includes a curved base 88 and a flat or planar bearing surface 90. The plurality of planar bearing surfaces 90 are parallel with each other and are perpendicular to axial centerline 86 of tubular wall 80. The plurality of planar bearing surfaces 90 form a plane which is perpendicular to axial centerline 86.

During the assembly of lower spring seat 60, axial centerline 86 of tubular wall 80 is aligned with the axial centerline of outer tube 62 of shock absorber 26. A press fit tool engages the plurality of bearing surfaces 90 defined by the plurality of lands or steps 84 and lower spring seat 60 is pressed onto outer tube 62 of shock absorber 26. The plurality of bearing surfaces 90 ensure that the load being used to press lower spring seat 60 onto outer tube 62 of shock absorber 26 is applied in a direction parallel with axial centerline 86 and the axial centerline of outer tube 62 of shock absorber 26. Once lower spring seat 60 is properly positioned onto outer tube 62 of shock absorber 26, a welding operation or other operation is performed to secure lower spring seat 60 to outer tube 62 of shock absorber 26. Because the press fit tool bears against the plurality of bearing surfaces 90 and not transition section 82 or annular disc 70, the same press fit tool can be used for multiple lower spring seat designs regardless of the angular relationship between tubular extension 72 and annular disc 70.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A strut assembly comprising:
    a top mount assembly including an upper spring seat;
    a shock absorber attached to said top mount assembly;
    a single piece lower spring seat attached to said shock absorber, said single piece lower spring seat including an annular disc and a tubular extension extending from said annular disc, said tubular extension including a tubular wall and a plurality of steps extending radially outward from said tubular wall; and
    a spring disposed between said upper spring seat and said lower spring seat; wherein
    each of said plurality of steps define a bearing surface for a press fit tool which presses said lower spring seat onto said shock absorber, the bearing surface being generally perpendicular to an axial centerline of said tubular wall; and
    wherein a terminal end of said tubular wall of said tubular extension opposite to annular disc defines a closed aperture completely surrounded by said tubular wall.

2. The strut assembly according to claim 1, wherein each step defines a curved base and said bearing surface.

3. The strut assembly according to claim 2, wherein said bearing surfaces define a bearing plane.

4. The strut assembly according to claim 3, wherein said bearing plane is generally perpendicular to said axial centerline of said shock absorber.

5. The strut assembly according to claim 1, wherein said annular disc defines a planar surface, an axial centerline of said tubular extension being at an angle with respect to said planar surface.

6. The strut assembly according to claim 5, wherein each step defines a curved base and said bearing surface.

7. The strut assembly according to claim 6, wherein said bearing surfaces define a bearing plane.

8. The strut assembly according to claim 7, wherein said bearing plane is generally perpendicular to said axial centerline of said shock absorber.

9. The strut assembly according to claim 5, wherein said angle of said axial centerline of said tubular extension with respect to said planar surface is less than 90°.

10. The strut assembly according to claim 9, wherein each step defines a curved base and said bearing surface.

11. The strut assembly according to claim 10, wherein said bearing surfaces define a bearing plane.

12. The strut assembly according to claim 11, wherein said bearing plane is generally perpendicular to said axial centerline of said shock absorber.

13. The strut assembly according to claim 1, further comprising a dirt shield disposed between said top mount assembly and said shock absorber, said dirt shield being attached to a bumper cap attached to said shock absorber at a position spaced from said lower spring seat.

14. A single piece lower spring seat comprising:
    an annular disc;
    a tubular extension extending from said annular disc, said tubular extension including a tubular wall;
    a plurality of steps extending radially outward from said tubular wall; wherein
    each of said plurality of steps define a bearing surface for a press fit tool which presses said lower spring seat onto a shock absorber, said bearing surface being generally perpendicular to an axial centerline of said tubular wall; and
    wherein a terminal end of said tubular wall of said tubular extension opposite to annular disc defines a closed aperture completely surrounded by said tubular wall.

15. The lower spring seat according to claim 14, wherein each step defines a curved base and said bearing surface.

16. The lower spring seat according to claim 15, wherein said bearing surfaces define a bearing plane.

17. The lower spring seat according to claim 16, wherein said bearing plane is generally perpendicular to said axial centerline of said shock absorber.

18. The lower spring seat according to claim 14, wherein said annular disc defines a planar surface, an axial centerline of said tubular extension being at an angle with respect to said planar surface.

19. The lower spring seat according to claim 18, wherein each step defines a curved base and said bearing surface.

20. The lower spring seat according to claim 19, wherein said bearing surfaces define a bearing plane.

21. The lower spring seat according to claim 20, wherein said bearing plane is generally perpendicular to said axial centerline of said shock absorber.

* * * * *